June 24, 1969
N. F. CERULLI
3,451,803
METHOD OF REMOVING CARBON FROM MIXTURES OF TUNGSTEN
POWDER AND THORIA AND INSURING A UNIFORM
DISPERSING OF THORIA
Filed Nov. 10, 1966
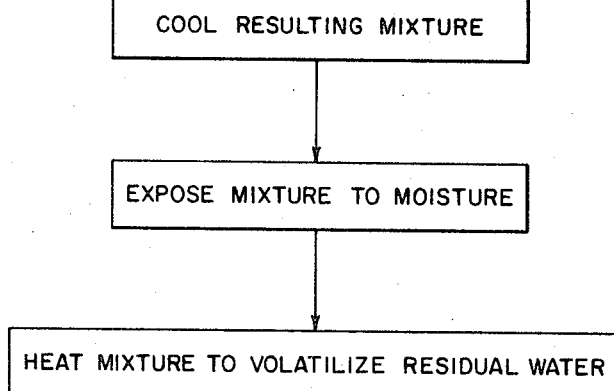
WITNESSES
INVENTOR
Nicholas F. Cerulli
BY
ATTORNEY United States Patent Office 3,451,803
Patented June 24, 1969

3,451,803
METHOD OF REMOVING CARBON FROM MIXTURES OF TUNGSTEN POWDER AND THORIA AND INSURING A UNIFORM DISPERSION OF THORIA
Nicholas F. Cerulli, North Caldwell, N.J., assignor to Westinghouse Electric Corporation, Pittsburgh, Pa., a corporation of Pennsylvania
Filed Nov. 10, 1966, Ser. No. 593,527
Int. Cl. C22c *1/05;* B22f *1/00*
U.S. Cl. 75—.5                                10 Claims This invention relates generally to processing of tungsten powder and, more particularly, to a method of removing carbon from a mixture of tungsten powder and thoria while simultaneously insuring a uniform dispersion of the thoria throughout the tungsten powder.

Thoria-doped tungsten is used in some special types of lamps which require extremely high strength filaments. Such thoriated tungsten also has application in tungsten wire or structural members which require high strength at high temperatures. For best performance of the tungsten filaments or other members, it is desirable to achieve a very fine and uniform dispersion of the thorium dioxide throughout the tungsten.

In the practices of the prior art, when doping the tungsten powder with the thoria doping constituent, it has been customary to add a solution of thorium nitrate either to tungsten metal powder, tungstic oxide or tungstic acid. The thorium nitrate is converted to thorium dioxide by heating. The tungsten oxide or tungsten acid is converted to metal powder by heating in a hydrogen atmosphere and the thorium dioxide is thus dispersed throughout the resulting formed tungsten metal powder. While this normally produces a reasonably fine and uniform dispersion of thorium dioxide, there is some tendency for the thorium dioxide to agglomerate.

In preparing thoriated tungsten powder on a production basis, small amounts of carbon often are present as an impurity and it is difficult to eliminate this impurity. Particularly in the case of lamp filaments, the carbon is detrimental to the performance of the lamp.

It is the general object of the present invention to provide a method of removing carbon from a mixture of tungsten powder and thoria while simultaneously insuring a uniform dispersion of the thoria in the tungsten powder.

It is a further object to provide a method for insuring a uniform dispersion of thoria in tungsten powder by the deliberate addition of an undesired material which is removed in a later processing step, in order to insure the uniform dispersion.

It is an additional object to provide a thoriated tungsten powder which, when processed into lamp filaments, provides improved performance for the lamps which incorporate such filaments.

The foregoing objects of the invention, and other objects which will become apparent as the description proceeds, are achieved by utilizing carbon in a mixture of tungsten powder and thoria to insure a uniform dispersion of the thoria. The carbon can be present either as an impurity, or as an additive, or as both an impurity and an additive, in such amount that the total-gram moles of thoria in the mixture are at least, and preferably more than one-third of the total gram-atoms of carbon in the mixture. This initial mixture is heated in an inert atmosphere or a vacuum at a predetermined temperature and for a sufficient time to react all of the carbon in the mixture with thoria to form thorium carbide. The initially reacted mixture is cooled and then exposed to moisture for a sufficient time to hydrolyze the formed thorium carbide. Thereafter, the hydrolyzed mixture is heated under non-reactive conditions in order to volatilize residual water.

For a better understanding of the present invention, reference should be had to the sole figure which sets forth a flow diagram illustrating the basic steps of the present method.

The starting material which is used in practicing the present invention is thoria-doped tungsten metal powder, wherein the thoria is added to the metal powder in accordance with conventional practices. It is usually desirable to have at least 0.25% by weight of the thoria, taken with respect to the tungsten metal powder, and not more than about 5% by weight of thoria, due to the difficulties which are encountered in swaging and drawing or rolling during later fabrication. As a specific example, thorium nitrate is added to tungstic oxide in such amount that there is 2% by weight of equivalent thorium dioxide, taken with respect to the equivalent metallic tungsten. The thorium nitrate is converted to thorium dioxide by heating and the tungsten oxide is converted to tungsten metal powder by heating in a hydrogen atmosphere. As an example, a heating period of one hour at a temperature of 1000° C. in hydrogen is sufficient to effect the conversion.

The foregoing mixture of tungsten powder and thoria frequently contains a small amount of carbon as an impurity, which carbon is retained, at least in part, during the latter processing steps. This carbon impurity affects the properties of the final material. Alternatively, and in accordance with the present invention, a small amount of carbon can be deliberately included as an additive.

In accordance with the present invention, the tungsten-thoria mixture, which contains a limited amount of carbon, is heated in an inert atmosphere or a vacuum at a predetermined temperature and for a sufficient time to react all of the carbon in the mixture with thoria in the mixture to form thorium carbide. Preferably, the mixture should be heated to a temperature of at least 1375° C. in order to effect the conversion and, as a specific example, the mixture is heated in an argon atmosphere at a temperature of 1750° C. for about three hours. This initial heating causes the thorium oxide to react with carbon in order to form thorium carbide (ThC), as well as carbon monoxide which is evolved. There may also be formed some $ThC_2$. In order that all of the carbon is reacted with the thorium dioxide, the carbon should be present in such amount that the total gram-moles of thoria are at least, and preferably more than one-third of the total gram-atoms of carbon. As a specific example, when processing a two-percent thoriated tungsten mixture, the total gram-moles of thoria are equal to the total gram-atoms of carbon in the mixture.

After the initial heating to form the carbide, the mixture is cooled, preferably to about room temperature for convenience of processing, and exposed to moisture. As a specific example, the initially reacted mixture is cooled to room temperature and exposed for three hours to room temperature air (25° C.) having a relative humidity of fifty percent. This hydrolyzes the thorium carbide to form thorium dioxide, water, hydrogen, and low molecular weight hydrocarbons. The hydrogen and hydrocarbons evolve from the mixture as gases.

As a final processing step, the mixture is heated to a temperature of at least 100° C. under non-reactive conditions for a sufficient time to volatilize residual water. As a specific example, the material is heated for two hours at 500° C. in vacuum, hydrogen or inert gas. The mixture could also be heated in air at lower temperatures, such as 150° C. which would not oxidize any of the components thereof, but from a processing standpoint, it is preferred to heat at a higher temperature under the non-reactive conditions as specified.

Summarizing the foregoing process, there is involved a cyclic reaction wherein thorium dioxide is reacted with the carbon to carbide same, the resulting thorium carbide is then exposed to moisture to hydrolyze same and form thorium oxide with associated moisture, and finally the mixture is dehydrated by heating. The foregoing process removes carbon and also insures a uniform dispersion of the thoria throughout the tungsten, since an additional reaction is involved which minimizes any tendency for the thorium oxide to agglomerate.

The amount of carbon impurity which may occur in the tungsten-thorium mixture will usually vary from batch to batch. In order to insure a reasonable level of carbon in the initial mixture, it may be desirable to deliberately add carbon to the tungsten-thoria mixture. This is readily accomplished by evenly wetting the tungsten-thoria mixture with a water or alcohol suspension of colloidal carbon or graphite. The added carbon plus carbon already present as impurity should not exceed the thoria-carbon ratio as specified hereinbefore.

The tungsten-thoria mixture, after processing in accordance with the present method, is further processed into final structural form in accordance with conventional practices. These involve forming a compact, self-resistance sintering the compact in a hydrogen atmosphere, and thereafter swaging and drawing or rolling. The resulting tungsten structural shapes have a high recrystallization temperature and exhibit high strength at high temperatures.

In performance tests, a large number of miniture-type lamps which incorporated filaments processed in accordance with the present invention were compared under shock and vibration conditions to "control" lamps which were identical except that they incorporated standard production thoriated tungsten which had not been processed in accordance with the present invention. The tests were conducted upon a so-called rotary drum tester, wherein the lamps, when energized, were subjected to a series of continuing shocks, and the testing was continued until all lamps had failed. The lamps which incorporated filaments prepared from material processed in accordance with the present invention exhibited an average life which was more than twice as great as the average life of the control lamps.

It will be recognized that the objects of the present invention have been achieved by providing a method for removing carbon from a mixture of tungsten powder and thoria while simultaneously insuring a uniform dispersion of the thoria in the tungsten powder. The tungsten members which are fabricated from tungsten processed in accordance with this method display a high strength at high temperatures, and lamps incorporating filaments prepared from material processed in accordance with the present invention exhibit excellent performance characteristics.

While preferred embodiments of the present invention have been illustrated and described in detail, it is to be particularly understood that the invention is not limted thereto or thereby.

I claim as my invention:

1. The method of removing carbon from a mixture of tungsten powder and thoria while simultaneously insuring a uniform dispersion of said thoria in said tungsten powder, wherein the carbon in said mixture is present either as an impurity, or as an additive, or as both an impurity and an additive, in such amount that the total gram-moles of thoria in said mixture are at least and preferably more than one-third of the total gram-atoms of carbon in said mixture, which method comprises:
    (a) heating said mixture in an inert atmosphere or a vacuum at a predetermined temperature for a sufficient time to react all of said carbon in said mixture with thoria in said mixture to form thorium carbide;
    (b) cooling said reacted mixture;
    (c) exposing said cooled mixture to moisture for a sufficient time to hydrolyze all of the formed thorium carbide; and
    (d) heating said hydrolyzed mixture under non-reactive conditions at a temperature of at least 100° C. for a sufficient time to volatilize residual water.

2. The method as specified in claim 1, wherein thoria is initially present in said mixture in amount of from 0.25% to 5% by weight of said tungsten powder.

3. The method as specified in claim 1, wherein said mixture is initially heated in an inert atmosphere or a vacuum at a temperature of at least 1375° C.

4. The method as specified in claim 3, wherein said mixture is heated initially in an inert atmosphere or a vacuum at a temperature of about 1750° C. for about three hours.

5. The method as specified in claim 4, wherein said mixture is cooled to about 25° C. after initial heating; said mixture is then exposed for about three hours to air having a relative humidity of at least about 50%, and finally said mixture is heated for about two hours at a temperature of about 500° C. in an inert atmosphere, vacuum, or hydrogen.

6. The method of insuring a fine dispersion of thoria in tungsten powder, which method comprises:
    (a) adding to a mixture of thoria and tungsten powder a predetermined amount of carbon, wherein the resulting total carbon in said mixture is present in such amount that the total gram-moles of thoria in said mixture are at least and preferably more than one-third of the total gram-atoms of carbon in said mixture;
    (b) heating said mixture in an inert atmosphere or a vacuum at a predetermined temperature and for a time sufficient to react all of said carbon in said mixture with thoria in said mixture to form thorium carbide;
    (c) cooling said reacted mixture;
    (d) exposing said cooled mixture to moisture for a sufficient time to hydrolyze all of the formed thorium carbide; and
    (e) heating said hydrolyzed mixture under non-reactive conditions at a temperature of at least 100° C. for a sufficient time to volatilize residual water.

7. The method as specified in claim 6, wherein thoria is initially present in said mixture in amount of from 0.25% to 5% by weight of said tungsten powder.

8. The method as specified in claim 7, wherein carbon is added to said mixture by evenly wetting said mixture with an alcohol or water suspension of graphite or carbon.

9. The method as specified in claim 7, wherein said mixture is heated initially in an inert atmosphere or a vacuum at a temperature of about 1750° C. for about three hours.

10. The method as specified in claim 9, wherein said mixture is cooled to about 25° C. after initial heating; said mixture is then exposed for about three hours to air having a relative humidity of at least about 50%, and finally said mixture is heated for about two hours at a temperature of about 500° C. in an inert atmosphere, vacuum, or hydrogen.

References Cited

UNITED STATES PATENTS

| | | | |
|---|---|---|---|
| 1,054,005 | 2/1913 | Lederer | 75—207 |
| 1,663,547 | 3/1928 | Gero | 75—207 |
| 1,741,953 | 12/1929 | Ramage | 75—.5 |
| 3,278,281 | 10/1966 | Ehringer | 75—207 |

L. DEWAYNE RUTLEDGE, *Primary Examiner.*

T. R. FRYE, *Assistant Examiner.*

U.S. Cl. X.R.

75—206, 207